United States Patent [19]

Wilcox et al.

[11] Patent Number: 4,500,098
[45] Date of Patent: Feb. 19, 1985

[54] GAS SEAL FOR ROTATING COMPONENTS

[75] Inventors: Ernest W. Wilcox, Lake Park; Jack W. Wilson, Jr., West Palm Beach, both of Fla.

[73] Assignee: United Technologies Corporation, Hartford, Conn.

[21] Appl. No.: 564,448

[22] Filed: Dec. 22, 1983

[51] Int. Cl.³ .................. F16J 15/34; F16J 15/40
[52] U.S. Cl. ........................ 277/170; 277/53; 277/81 P; 277/230; 415/175
[58] Field of Search ............ 277/53, 54, 229, 230, 277/81 P, 231, 169, 170; 415/172, 174, 175

[56] References Cited

U.S. PATENT DOCUMENTS

| | | | |
|---|---|---|---|
| 2,509,290 | 5/1950 | Elvin et al. | 277/230 |
| 2,545,916 | 3/1951 | Clark | 277/53 |
| 2,635,932 | 4/1953 | Heusser | 277/230 |
| 2,667,804 | 2/1954 | Boyer et al. | 277/230 |
| 2,844,426 | 7/1958 | Glaser | 277/169 |
| 3,501,089 | 3/1970 | Alford | 277/53 |
| 3,514,112 | 5/1970 | Pettengill | 277/53 |
| 3,834,719 | 9/1974 | Shin et al. | 277/170 |
| 4,103,899 | 8/1978 | Turnel | 415/175 |
| 4,138,125 | 2/1979 | Lucas | 277/170 |
| 4,212,473 | 7/1980 | Arai | 277/81 P |

Primary Examiner—Robert I. Smith
Attorney, Agent, or Firm—Stephen E. Revis

[57] ABSTRACT

A seal between co-rotating, opposed annular surfaces of interconnected elements comprises a multi-filament wire rope disposed within an annular groove formed at the interface between the two surfaces, the groove being wedge-shaped in cross-section, one side of the wedge being formed by each element. The wire rope is forced into sealing relationship with the groove surfaces along its entire length by centrifugal forces. The multi-filament wire rope has improved sealing capability over solid, single filament wire seals of the prior art. The seal is particularly well suited for use in the hot turbine section of a gas turbine engine and is resistant to damage and failures due to multiple engine cycles.

4 Claims, 4 Drawing Figures

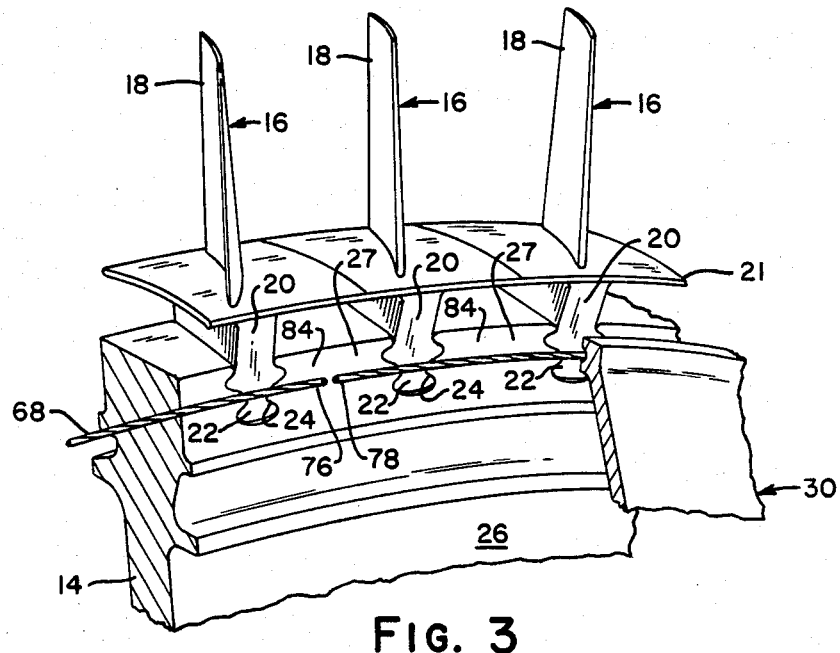
FIG. 3
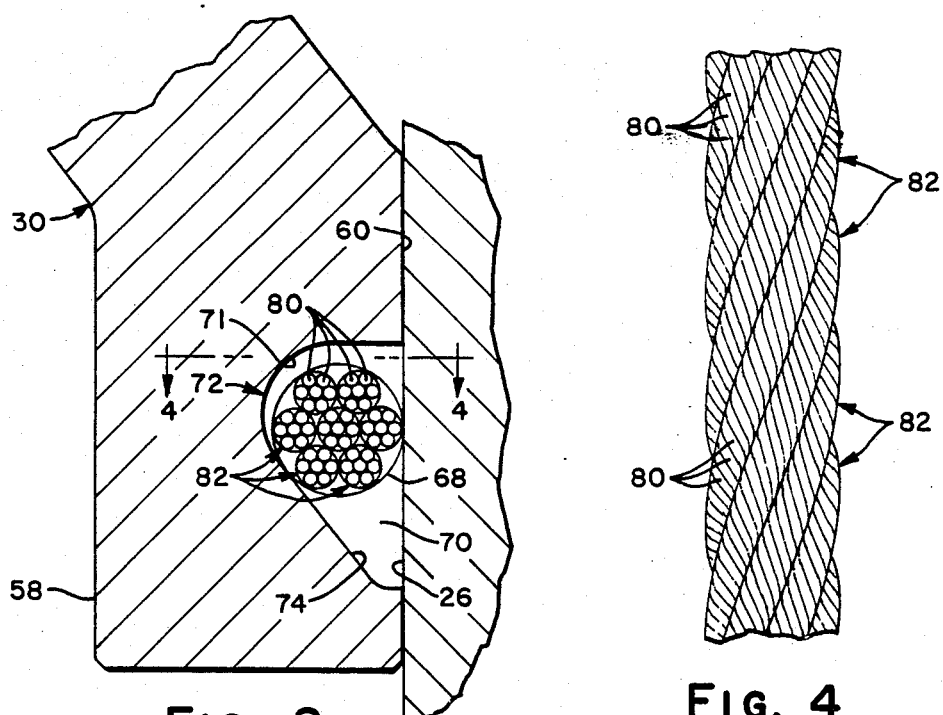
FIG. 2
FIG. 4

GAS SEAL FOR ROTATING COMPONENTS

The Government has rights in the invention pursuant to Contract No. F33657-82-C-0003 awarded by the Department of the Air Force.

DESCRIPTION

1. Technical Field

This invention relates to gas seals.

2. Background Art

It is common in rotating machinery to require an annular seal between the axially facing opposed surfaces of adjacent annular components, which components are interconnected and rotate together at the same speed. The purpose of the seal is to prevent radial gas flow from an annular gas space on one side of the seal to another gas space on the other side of the seal.

In the prior art an annular groove is disposed in one of the opposed annular surfaces. A radially inwardly facing surface of the groove converges toward the other of the opposed annular surfaces in a radially outward direction to form an annular compartment which is V-shaped in cross-section. A single wire of solid circular cross-section is disposed within the V-shaped compartment and extends once around the compartment to form a loop. The ends of the wire are not attached, but may touch or be closely spaced from each other. During rotation of the components centrifugal force causes the wire to be pressed along its entire length into sealing contact with both annular surfaces.

In a gas turbine engine the component forming one side of the V-shaped compartment may be a turbine disk which grows and contracts radially as the engine cycles due to thermal responses and changes in centrifugal forces. The solid cross-section wire seal has not proved completely adequate in that environment. It has been found that the solid wire increases in length as the disk and, consequently, the seal compartment moves radially outwardly. An inspection of these seals upon engine cool down after a number of engine cycles has sometimes found the wire to be wavy or crimped in several locations and its length greater than its original length. The wire in some instances, evidently yielded upon expansion and did not return to its original length. Thereafter, when the seal compartment returned to its original position, the ends of the elongated wires apparently interfered with each other and the wires buckled within the compartment.

In situations where the compartment sealing surface is not perfectly smooth and/or continuous, such as the surface of a turbine disk at a radius near the rim wherein the sealing surface is formed by blade roots alternating with the disk lugs which define the blade root slots, the solid wire seal of the prior art does not adequately conform to the surface and sealing effectiveness is reduced. Making the wire thinner so that it is more flexible and conforms better reduces the wires overall strength, which can result in the wire breaking as a result of the high centrifugal loads and temperatures to which it is subjected.

DISCLOSURE OF INVENTION

One object of the present invention is an improved seal between axially facing opposed annular surfaces which rotate together at the same speed and about the same axis.

Another object of the present invention is a seal between opposed, rotating annular surfaces, which seal is able to withstand high temperatures, and can accommodate radial movement of the sealing surfaces resulting from temperature and rotational speed changes.

A further object of the present invention is a seal between axially facing opposed annular surfaces, which surfaces may be somewhat irregular and/or formed from a plurality of circumferentially disposed elements.

According to the present invention an annular seal between co-rotating axially facing, opposed annular surfaces of interconnected components includes an annular groove in the annular surface of one of the components, which groove includes a radially inwardly facing frusto-conical surface which converges toward the opposing annular surface of the other component defining a seal compartment between them within which is disposed a flexible wire rope comprising a plurality of wire filaments twisted together, the rope extending once substantially completely around the compartment in substantially continuous contact with both the frusto-conical surface and the annular surface opposed thereto.

As the components rotate, the wire is pressed or wedged into sealing relationship against the frusto-conical surface and the opposed annular surface by centrifugal forces. As the components grow due to thermal responses and centrifugal forces the rope of twisted filaments moves radially outwardly with movement of the compartment while remaining in sealing relationship with the surfaces. It is believed that the multiple filament and twisted nature of a rope construction provides the strength and elasticity lacking in prior art single strand seals of the same over-all diameter, which strength and elasticity prevents yielding and breaking of the wire rope seal under high temperature and centrifugal load conditions and due to cycling. Further, the multi-filament rope seal also retains its resiliency and shape. Additionally, because it is made from a plurality of filaments which are twisted together it has more flexability as compared to prior art single strand seals of the same over-all diameter and is thereby able to seal better against irregularities or discontinuities in the annular seal surfaces.

The foregoing and other objects, features and advantages of the present invention will become more apparent in the light of the following detailed description of the preferred embodiments thereof as shown in the accompanying drawing.

BRIEF DESCRIPTION OF THE DRAWING

FIG. 2 is an enlarged view of the area A of FIG. 1 showing details of the seal assembly of the present invention.

FIG. 3 is a perspective view taken along the line 2—2 of FIG. 1.

FIG. 4 is a view, taken along the line 4—4 of FIG. 2, of the wire rope used in the seal assembly of the present invention.

BEST MODE FOR CARRYING OUT THE INVENTION

Figure 1:
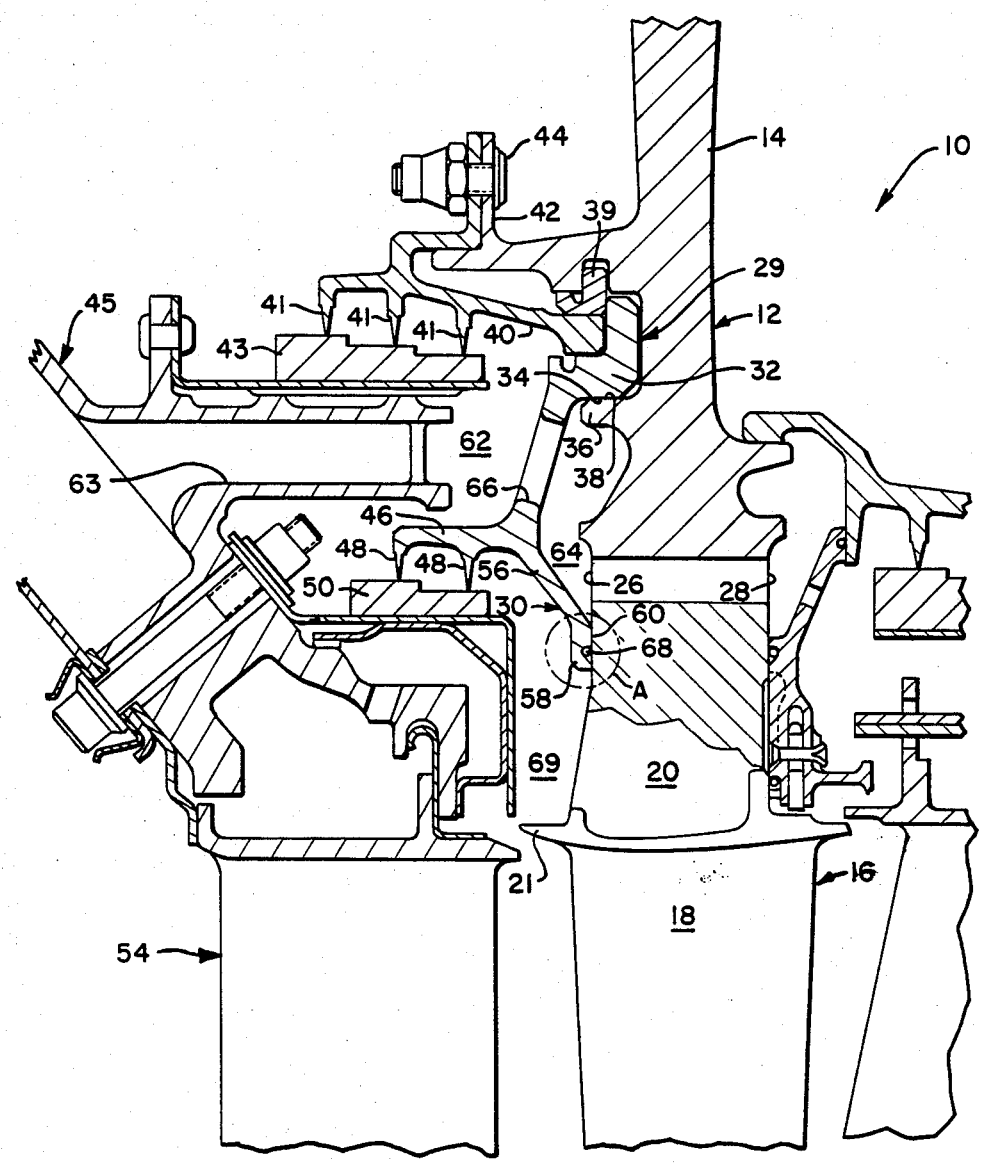
FIG. 1 is a sectional view taken through a portion of the turbine section of a gas turbine engine.

As an exemplary embodiment of the present invention consider the portion of a gas turbine engine rotor assembly generally represented by the reference numeral 10 in FIG. 1. The rotor assembly 10 comprises a rotor 12 which includes a disk 14 having a plurality of blades 16 circumferentially spaced about the periphery thereof. As best shown in FIG. 3, each blade 16 comprises an airfoil portion 18 having a root portion 20 and platform 21 integral therewith. The root portion 20 includes a fir-tree shaped end 22 disposed in similarly shaped fir-tree slots 24 which extend axially through the disk 14 from the disk front surface 26 through the disk rear surface 28. The slots 24 are formed between what are herein referred to as disk lugs 27. The disk 14 is secured to a shaft (not shown) by conventional means (not shown). The axis of the shaft is the axis of the engine about which the rotor assembly 10 rotates.

The rotor assembly 10 includes an annular plate 30 secured to the front side of the disk 14. The means by which the plate 30 is attached to the disk 14 does not form a part of the present invention. In this embodiment the radially inner end 29 of the plate 30 includes an axially extending flange 32 which has a radially outwardly facing cylindrical surface 34. The front side of the disk 14 includes an axially extending flange 36 having a radially inwardly facing cylindrical surface 38. The surface 34 mates tightly with the surface 38 to orient the plate 30 radially relative to the disk 14. The plate 30 is trapped axially in position by an inner annular split ring 39 and labyrinth seal member 40 which is bolted to a radially inwardly extending flange 42 of the disk 14, such as by bolts 44. The seal member 40 includes a plurality of conventional, radially outwardly extending knife edges 41 which are in sealing relationship to a stationary annular seal land 43 secured to stationary structure 45.

The plate 30 also includes an axially extending cylindrical seal member 46 integral therewith and which carries a plurality of conventional, radially outwardly extending knife edges 48. The knife edges 48 are in sealing relationship with a stationary annular seal land 50 secured to the stationary structure 45. The stationary structure 45 cooperates with a stage of stator vanes 54 disposed upstream of the blades 16.

The plate 30 further includes a frusto-conical portion 56 extending radially outwardly in a donwstream direction. The frusto-conical portion 56 has a radially outer end 58. The end 58 includes an annular surface 60 facing axially downstream which abuts the front surface 26 of the rotor 12 and the ends 22 of the blade roots 20.

As can be seen in the drawing, the seal members 40, 46, the plate 30, and the stationary structure 45 define an inner annular compartment 62 which is fed cooling air from a plurality of curcumferentially spaced apart nozzles 63. The plate 30, between its inner and outer ends 29, 58, stands away from the disk front surface 26 defining an annular cooling air space 64 which, through large holes 66 in the plate 30 communicates with and is, in effect, a part of the compartment 62. The knife edges 48 and a wire rope seal 68 (to be further described hereinbelow) prevent leakage from the compartment 64 radially outwardly into an outer gas space 69.

As best shown in FIGS. 2 and 3, the wire rope seal 68 is disposed in an annular compartment 70 which is defined by the front surface 26 of the disk 14 and the surface 71 of an annular groove 72 in the surface 60 of the plate 30. The surface 71 of the groove includes a frusto-conical portion 74 which tapers radially outwardly toward the surface 26 of the disk such that the compartment 70 includes a wedge-shaped portion in cross-section. The wire rope seal 68 has a length such that it extends substantially once around the compartment 70 about the engine axis. The ends of the seal 68 are designated by the reference numerals 76, 78, respectively, and can be seen in FIG. 3. When the seal 68 is cold and the rotor is not rotating, the free ends 76, 78 of the seal 68 just touch or are slightly spaced from each other. When disposed in the groove 70, the seal 68 is in substantially continuous contact with both the disk surface 26 and the frusto-conical surface 74. During rotation of the rotor 12 the seal 68 presses tightly against these surfaces due to centrifugal forces and the wedge shape of the compartment 70, thereby creating the desired gas seal.

As best shown in FIG. 2 and FIG. 4, the seal 68 is comprised of a plurality of wire filaments 80 which are twisted together such that the seal 68 is like a wire rope. This construction gives the seal 68 greater flexibility, resiliency, and strength in comparison to single strand wire seals of the prior art having the same overall diameter. Each end 76, 78 of the seal 68 is welded to prevent unraveling of the filaments. In this preferred embodiment the wire rope seal 68 has a 7 by 7 construction. This means the seal 68 comprises seven bundles 82 of filaments 80, the bundles 82 being twisted together. Each bundle 82 comprises seven filaments 80 which are twisted together to form the bundle 82. The seal 68 of the embodiment shown thus comprises a total of forty-nine individual filaments 80.

In a gas turbine engine environment wherein the temperature of the seals 68 could reach as high as 1250° F. and wherein the rotor speeds may reach 14,000 RPM we have used 7 by 7 wire rope seals 68 having an overall external diameter of about 0.04 inch and made of nickle-chrome (Inconel 600) filaments. In the embodiment shown, the seal is disposed about the engine axis at a radius on the order of 9.0 inches. Identical wire rope seals of the appropriate length are also planned to be used in a small gas turbine engine at a radius of about 4.0 inches and which rotates at a speed of about 50,000 RPM.

The angle of the taper of the frusto-conical surface 74 will determine the size of the axial sealing force against the disk surface 26. In this embodiment the angle between the frusto-conical surface 74 and a radial line is about 38 degrees. If the angle is too large, the sealing force against the disk 14 may be insufficient to reduce gas leakage to acceptable levels. If the angle is too small the axial load may be so large that the end 58 of the plate 30 is forced away from the disk 14 such that a gap is created between the surface 60 of the plate 30 and the surface 26 of the disk 14.

As best shown in FIG. 3, the seal 68 lies at a radius wherein the annular surface against which it seals is comprised, alternately, of blade root ends 22 and the end faces 84 of the disk lugs 27. Although at nominal part dimensions the root ends 22 and end faces 84 are in the same plane, dimensional tolerances result in discontinuities. The wire rope seal 68 is believed to conform to these discontinuities better than the prior art seals and without any permanent deformation; and some of the present invention's improved sealing capability is attributed to this unique property.

Although the invention has been shown and described with respect to a preferred embodiment thereof, it should be understood by those skilled in the art that other various changes and omissions in the form and detail thereof may be made therein without departing from the spirit and the scope of the invention.

We claim:

1. A seal assembly comprising;
a first component adapted to rotate about an axis and including means defining a radially extending annular surface disposed about said axis of rotation;
a second component interconnected to said first component and adapted to rotate therewith at the same speed about the same axis of rotation, said second component comprising wall means adjacent said annular surface, said wall means defining a substantially frusto-conical surface coaxial with said annular surface defining an annular seal compartment therebetween; and
a free length of flexible wire rope, said flexible wire rope comprising a plurality of wire filaments twisted together, said rope disposed in said annular compartment and extending once substantially completely around said compartment in substantially continuous contact with both said annular surface and said frusto-conical surface, wherein during rotation of said seal assembly said wire rope is pressed into sealing relationship against said annular and frusto-conical surfaces by centrifugal forces.

2. The seal assembly according to claim 1 wherein said flexible wire rope comprises a plurality of wire bundles twisted together, each bundle comprising a plurality of wire filaments twisted together.

3. The seal assembly according to claim 1 wherein said first component is a gas turbine engine rotor.

4. The seal assembly according to claim 1 wherein said first component is a rotor comprising a disk having an axially facing surface and axially and radially extending lugs uniformly circumferentially spaced about the periphery of said disk defining axially extending blade root slots therebetween through said disk, each of said lugs having an end face forming a portion of said disk axially facing surface, said rotor including a plurality of rotor blades, each blade having a root disposed within a respective one of said slots, each root having an axially facing end surface substantially flush with said end faces of said lugs wherein said lug end faces and blade root end surfaces define said annular surface of said seal compartment against which said wire rope seals during rotation of said rotor.

* * * * *